US006941291B1

(12) United States Patent
Zoller et al.

(10) Patent No.: US 6,941,291 B1
(45) Date of Patent: Sep. 6, 2005

(54) METHOD AND DEVICE FOR A USER PROFILE REPOSITORY

(75) Inventors: Gregory Zoller, Raleigh, NC (US); Samir Mehta, San Jose, CA (US); Steven Fisher, Mountain View, CA (US); Raj Kumar, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 177 days.

(21) Appl. No.: 09/732,541

(22) Filed: Dec. 7, 2000

(51) Int. Cl.[7] .............................................. G06F 17/30
(52) U.S. Cl. ..................... 707/1; 707/5; 707/6; 711/118
(58) Field of Search .......................... 707/1–10, 103 R, 707/201; 711/119, 141, 118

(56) References Cited

U.S. PATENT DOCUMENTS

| | | | | |
|---|---|---|---|---|
| 5,560,005 A | * | 9/1996 | Hoover et al. ................. 707/10 |
| 5,594,899 A | * | 1/1997 | Knudsen et al. ................ 707/2 |
| 5,675,788 A | * | 10/1997 | Husick et al. ............ 707/104.1 |
| 5,895,465 A | * | 4/1999 | Guha ............................. 707/4 |
| 5,970,490 A | * | 10/1999 | Morgenstern ................ 707/10 |
| 6,012,067 A | * | 1/2000 | Sarkar ..................... 707/103 R |
| 6,081,805 A | * | 6/2000 | Guha ............................. 707/5 |
| 6,085,976 A | * | 7/2000 | Sehr ........................... 235/384 |
| 6,108,651 A | * | 8/2000 | Guha ............................. 707/4 |
| 6,253,194 B1 | * | 6/2001 | Johnson et al. ................ 707/2 |
| 6,256,712 B1 | * | 7/2001 | Challenger et al. ......... 711/141 |
| 6,295,533 B2 | * | 9/2001 | Cohen ............................ 707/5 |
| 6,389,429 B1 | * | 5/2002 | Kane et al. .................. 707/200 |
| 6,418,448 B1 | * | 7/2002 | Sarkar ...................... 707/104.1 |
| 6,438,552 B1 | * | 8/2002 | Tate ............................. 707/10 |
| 6,473,765 B1 | * | 10/2002 | Fink ........................... 707/102 |
| 6,601,072 B1 | * | 7/2003 | Gerken, III .............. 707/103 R |
| 6,691,166 B1 | * | 2/2004 | Gasior et al. ............... 709/232 |

OTHER PUBLICATIONS

Mei Kobayashi and Koichi Takeda, "Information Retrieval on the Web", IBM research, vol. 32, No. 2, Jun. 2000.*

* cited by examiner

Primary Examiner—Uyen Le
Assistant Examiner—Hanh Thai

(57) ABSTRACT

A method and device for providing access, via a single point, to information stored on multiple data sources. One embodiment comprises a method in which first an interface (port) receives a call specifying a user identifier and a set of information from an application program. The set of information comprises a number of fields, where the fields correspond to information which is physically stored over a number of databases. Next, the method determines the location of the fields of information corresponding to the user identifier. Next, using the identifier which the application program passed in, the method retrieves the information. For example, the method may first retrieve information corresponding to a first field from a first database. Then, the method may retrieve information corresponding to a second field from a second database. Then, the method provides the information to the application program.

31 Claims, 8 Drawing Sheets

METHOD AND DEVICE FOR A USER PROFILE REPOSITORY

FIELD OF THE INVENTION

The present invention relates to the field of distributed computing. Specifically, the present invention relates to a method and device for allowing centralized access to user profile data which is physically located over numerous databases and may be stored in different formats.

BACKGROUND ART

In the Internet age it is proving increasingly useful to provide application programs access to large volumes of user information. For example, in order to make the user experience on the visit to the website better, a user's preferences may be stored and used during the next visit. This information may comprise entitlement and authentication information, as well user preferences. Unfortunately, accessing this user information presents a severe challenge to application programs when using conventional methods.

One reason for this difficulty is that the user information may be spread over numerous databases. Various departments within a corporation may have their own databases, each with its own record of data for a given user. For example, the marketing department and the legal department may have their own databases. Thus, the application program seeking access to the user information needs to know the physical location of all the databases, with this conventional method.

Further complicating access to such information is that the various databases may store the information in different formats. Thus, even were an application program to know the physical location of the data, another hurdle must be faced in dealing with the various storage formats. Additionally, the content of the stored information may be mixed. For example, entitlement information may be mixed with user profile information, thus making data handling more complex. Furthermore, the owner of the database may make changes to the format or content of the database. Thus, appropriate changes must be made to the application program. However, these changes may fail to be made for a variety of reasons, for example, lack of notification to the application program, lack of resources or time to modify the application program, etc.

One conventional solution to the access of user information is to build a single database containing all the user information in a single format. However, this removes control of the information from individual departments. For example, marketing and legal departments may wish to have separate databases with their own version of the data and with their own control over the data.

Furthermore, transferring a large user record uses memory inefficiently. A certain amount of memory must be carved out for storing the user information for all the users currently using the website. As the volume of users increases, it becomes increasingly difficult to store all of the information. The increase in user volume (as well as increases in the number groups which store user information and changes to the type of data which is stored) also requires a method with the flexibility to expand (for example, to add databases) without requiring substantial software modifications or knowledge of such expansion to the application programs.

A still further complication is that each database may have different information for a given user. For example, the legal department may have a different e-mail address for a user than does the personal department. Consequently, the application program may face confusion over which data is valid.

Compatibility issues create further problems. For example, application programs may be written in a variety of computer languages, such as JAVA, C, and C++ and may run on a variety of computer platforms. Consequently, these application programs face hurdles in accessing data stored on a computer running on a different computer platform and/or with programs written in a different language.

Therefore, a need exists for a method and device for allowing access to user profile information. A further need exists to provide access to such information stored in multiple data sources. A still further need exists for such a method and device which provides a single point of entry for application programs to access such data. A still further need exists for shielding an application program from changes with respect to the location or format of the stored user data. A still further need exists for such a method and device which organizes well the various types of information which may be associated with a user, such as entitlement information and user profile information. A need exists for such a method and device which uses memory, CPU, and network resources efficiently. A still further need exists for such a method and device which is expandable without adversely impacting application programs.

SUMMARY OF THE INVENTION

Embodiments of the present invention provide for a method and device which provides access, via a single point, to user information stored on multiple data sources. Embodiments shield an application program seeking access to such user information from changes with respect to the location or format of the stored user data. Embodiments organize well the various types of information which may be associated with a user, such as entitlement information and user profile information. Embodiments provide for a method and device which uses memory, CPU, and network resources efficiently. Embodiments provide for a method and device which is expandable without adversely impacting application programs. The present invention provides these advantages and others not specifically mentioned above but described in the sections to follow.

A method and device for providing access, via a single point, to user information stored on multiple data sources is disclosed. One embodiment comprises a method in which first an interface (port) receives a call from an application program. The call specifies a user identifier and a set of user information. For example, the set of user information may be a logical collection such as, subscription preferences, account activity, training, etc. The set of user information comprises a number of fields, where the fields correspond to user information which is physically stored over a number of databases. Next, the method determines the location of the fields of user information corresponding to the user identifier and the requested information. For example, the database that contains the field of data for the given user is found. The user information may be stored locally or remotely. Furthermore, this information may comprise user profile information or entitlement and authentication information. Next, using the identifier which the application program passed in, the method retrieves the user information. For example, the method may first retrieve user information corresponding to a first field from a first database. Then, the method may retrieve user information corresponding to a second field from a second database. Then, the method provides the set of user information to the application program.

Another embodiment provides for a method that allows the application program to change preferences explicitly. Still another embodiment monitors the user's activity to set new preferences implicitly. Another embodiment determines the user's entitlement status corresponding to the set of user information data which the application program requested.

Yet another embodiment conserves system resources by creating a cache of user records and removing the records which are inactive. In one embodiment, a first database contains user profile information and a second database contains entitlement information. Still another embodiment moves user information from a first of databases to a second databases. This, movement is transparent to the calling application program.

Another embodiment of the present invention provides for a device for providing distributed access to user information distributed over a plurality of databases. Each database contains a number of fields of user information for a number of users. The device comprises a program operable to logically map the fields of user information into a plurality of logical collections of the user information. At least one of the logical collections comprises a plurality of the fields of the user information. Thus, fields of user information are organized into logical collections of user information. The program is also operable to process requests from an application program. The requests identify a logical collection of the user information, as well as a user. The program is further operable to physically map the plurality of fields of the user information to the plurality of databases. Therefore, the program is operable to determine the database(s) storing the fields of the user information corresponding to the logical collections of the user information for a given user. Furthermore, the program is further operable to retrieve the user information corresponding to the fields, the user information corresponding to the user identified by the request from the application program.

In one embodiment the physical mapping further maps the plurality of fields of the user information to a database which is external to the system containing the program. The repository program is thus able to access user information outside of the repository system.

In another embodiment the above program is further operable to store the requested set of user information and to remove the requested set of user information if it has not been accessed for a pre-determined period of time. In still another embodiment, the program is further operable to update the user information by writing to a database.

Yet another embodiment provides for a computer readable medium having stored therein a computer program that when executed by a processor causes the computer system to implement a method for providing access to user information stored in multiple databases.

DETAILED DESCRIPTION OF THE INVENTION

Figure 1:
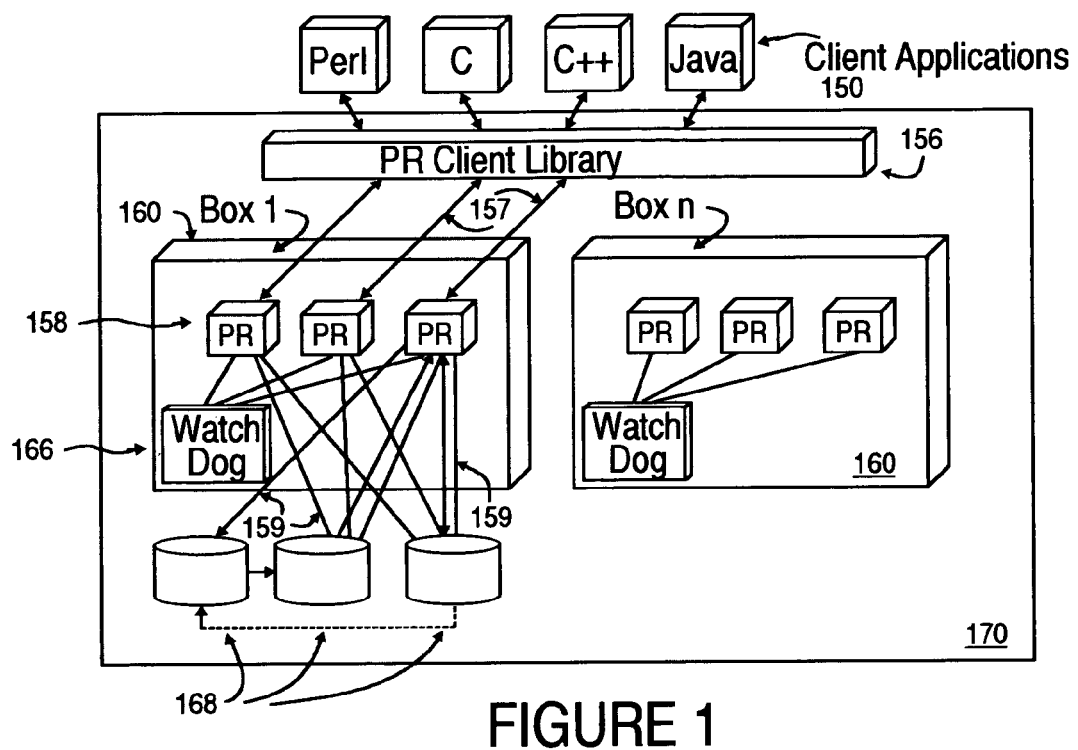
FIG. 1 is a block diagram illustrating an application programming interface (API) architecture, according to an embodiment of the present invention.

In the following detailed description of the present invention, a method and device for providing distributed access to user profile information, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "indexing" or "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and Device for a User Profile Repository

The present invention provides for a method and device for providing access, via a single entry point, to user information which may be stored in multiple datasources. Importantly, not all user information need be stored in the system's own database; however, a standard API allows application programs to have a centralized access to user information wherever it may be physically located and in whatever format it is stored.

FIG. 1 illustrates an exemplary profile repository system 170 of one embodiment of the present invention. Client application programs 150 running on a variety of platforms and written in a variety of programming languages (e.g., Practical Extraction Report Language (PERL), C, C++, JAVA) make calls to the client library 156. Thus, the client library 156 provides a bridge between the various platforms and computer languages to the profile repository (PR) server programs 158.

Still referring to FIG. 1, embodiments of the present invention may have any number of computer systems 160 hooked together, each with a limited number of profile repository programs (servers) 158. In this fashion, the system is easily expandable. The servers 158 monitor connections to the repository system 170. The profile repository server (program) 158 which receives the request processes it. Communication between a profile repository program 158 and the PR client library 156 is via request communication link 157, which in one embodiment is compliant with common object request broker architecture (CORBA).

In one embodiment, each computer system 160 also has a watch dog 166 which serves as a master for all profile repositories programs 158 running on that computer system 160. The watch dog 166 monitors and maintains the profile repository programs 158 on each computer system 160. The watch dog 158 also monitors system resources, for example, memory, CPU usage, disk input/output, etc.

Still referring to FIG. 1 each computer system 160 may access several different databases 168. The databases 168 may contain entitlement (authentication) information, user profile information, or the like. However the present invention is not limited to information of these types. The databases 168 may be internal or external to the repository system 170. The databases 168 may be, for example, a relational database, a directory server, a dBM, or the like. The database communication links 159 between the profile repository programs 158 and the databases 168 are exemplary.

Figure 2:
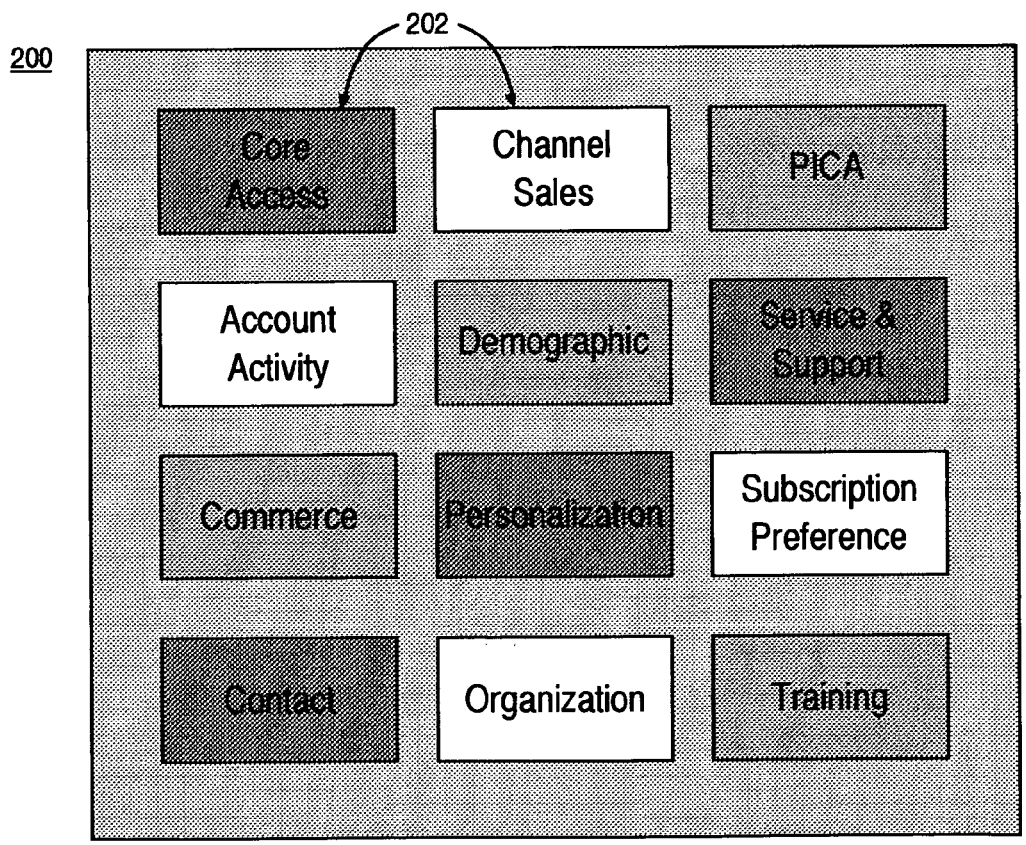
FIG. 2 is an illustration of exemplary views which contain fields of user profile information, according to an embodiment of the present invention.

In order to better organize the user information, embodiments of the present invention organize information from a user record 200 into views 202, as seen in FIG. 2. A view 202 is a grouping of logically related data (e.g., user information) into a single collection, for example, account activity, subscription preferences, etc. Applications 150 may request one or more views 202 (e.g., logical collections of user information), which a profile repository program 158 will access and return. The requested information may pertain to a single user or a group of users. In one embodiment, the user information may be written to the datasources. By breaking the user information into views 202, the present invention conserves memory because only the requested views 202 need to be loaded. Furthermore, the application program 150 need not know the physical location of the user information. For example, the information may be physically stored on an entitlement database, a user profile database or even be external to the repository system 170. Furthermore, the user information corresponding to a single view 202 may be on more than one database 168. Consequently, embodiments of the present invention may greatly simplify application program 150 access of user information. Additionally, if databases 168 are added to store more user information, again the application program 150 is insulated from these changes.

An additional advantage of breaking the user information into views 202 is that a separate level of security or entitlement may apply to each view 202. Embodiments of the present invention also provide for cleaning up a view 202 if it is unused for a given time period (e.g., removing the view from a cache of currently active user views 202). Embodiments of the present invention allow more types of views 202 to be added to a record 200.

Figure 3:
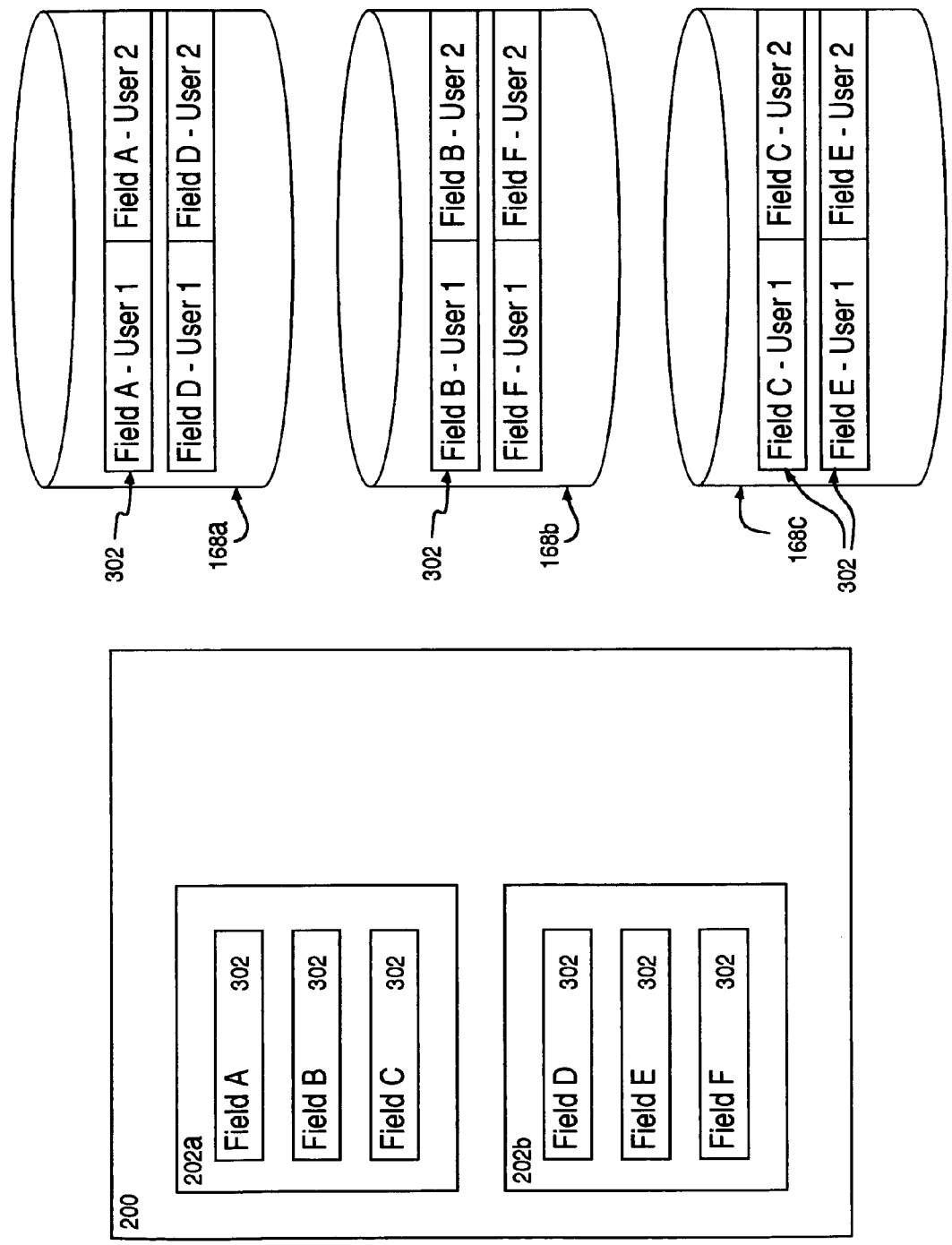
FIG. 3 is an illustration of mapping of fields of user information to databases, according to an embodiment of the present invention.

FIG. 3 provides more details of a mapping of the views 202 to the physical locations of the user information. Each view 202 (e.g., logical collection of user information) comprises a number of fields 302 of user information. However, the data may be organized in a different way on databases 168 than it is organized in the views 202. For example, view 202a contains fields A, B, and C. Field A and field D are physically located on database 168a. However, field C is physically located on database 168c. Embodiments of the present invention keep track of the physical location of each field 302. In this fashion, the application programs 150 do not have to, which vastly simplifies programming at that level. The information will be validated for each field 302 within view 202. For example, a name should not have a digit, etc.

Still referring the FIG. 3, the databases 168 have a set of fields 302 for a number of users. The application program 150 will specify the user for which the information of a given view or views 202 is desired. Furthermore, the database 168 may be external to the repository system 170. For example, databases 168a and 168b are internal, while database 168c is external to the repository system 170. The present invention is well suited to operating with any number of internal and external databases 168. The mapping in FIG. 3 is exemplary and in actuality may contain far more fields 302 and views 202.

Figure 4:
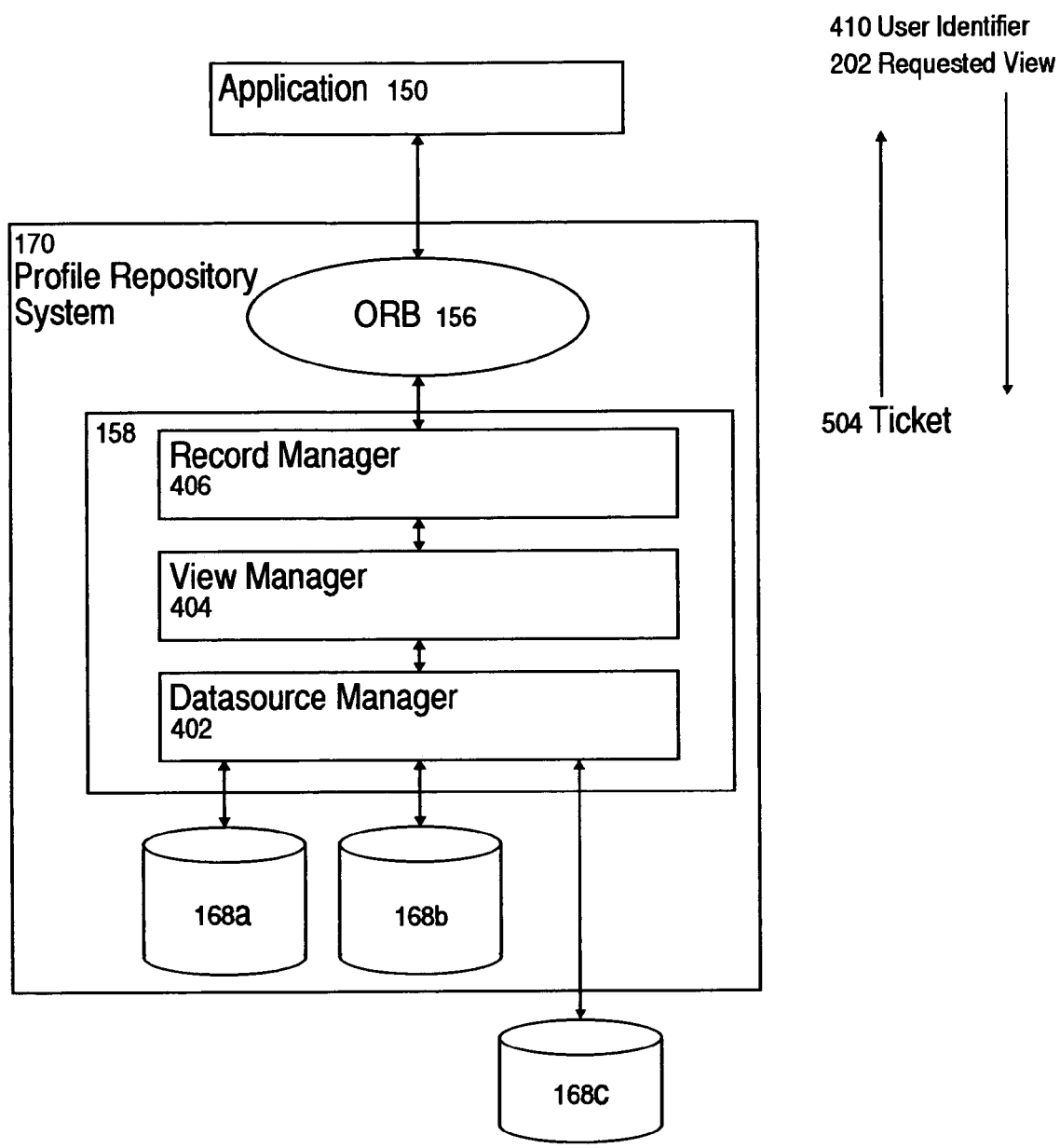
FIG. 4 is a diagram of various levels of a profile repository system architecture, according to an embodiment of the present invention.

Embodiments of the present invention comprise a number of layers that manage data from the physical storage 168 to final presentation to the application clients 150, as illustrated in FIG. 4. The user information may be stored on a plurality of databases 168 each having thereon a plurality of fields (FIG. 3, 302) of user information. For example, an entitlement database 168a, a user profile database 168b, or an external database 168c outside of the repository system 170.

Still referring to FIG. 4, various components of a repository program 158 are described. First, a datasource manager 402 keeps track of the various databases 168. The datasource manager 402 is operable to map high level requests to access or write to a view 202 into the potentially multiple low-level database 168 requests. For example, the program 158 has a physical mapping of the plurality of fields 302 of the user information to the plurality of databases 168, wherein the program 158 is operable to determine which of the plurality of databases 168 contain the fields 302 of the user information corresponding to the requested user information.

Still referring to FIG. 4, a view manager 404 keeps track of view information. This information is static. For example, the repository program 158 has a logical mapping of the fields 302 of user information into a plurality of logical collections of the user information (e.g., views 202), wherein at least one the logical collections comprise a plurality of the fields 302 of the user information.

Still referring to FIG. 4, also shown is a record manager 406 which manages a cache of user records 200 that are currently active. The record manager 406 also removes from the cache records 200 which have been un-used for a pre-determined period of time. Thus, the program 158 is operable to store the requested set of user information (e.g., a view 202) and to remove the requested set of user information if it has not been accessed for a pre-determined period of time. It will be understood that functions of the different layers of code may be performed by a single computer program or may be split in a different fashion.

Still referring to FIG. 4, from outside the repository system 170, client applications 150 may access the profile repository system 170 through an object request broker (ORB) 156. In one embodiment, the ORB is a JAVA ORB. In this fashion, embodiments of the present invention allow applications 150 running on different platforms and written in different programming languages to access the profile repository server 158. The applications 150 communicate with the repository system 170 through a published repository API (not shown). Thus, the profile repository program 158 is operable to process requests from an application program 150, the requests identifying a first of the plurality of logical collections of the user information and a user.

A method of providing a practical extraction report language (PERL) to common object request broker architecture (CORBA) is described in co-pending U.S. patent application Ser. No. 09/724,205, filed Nov. 27, 2000, entitled, "Method and System for Allowing a PERL Application to Access a Distributed Object Via CORBA", by Zoller, and assigned to the assignee of the present invention, which is hereby incorporated by reference in its entirety. The present invention is not limited to providing access to application programs 150 via an ORB 156.

When calling the repository system 170, an application 150 provides a user identifier 410 and a requested view 202. In one embodiment, the repository system 170 returns a ticket 504, which is used to time-out unused records 200.

Figure 5:
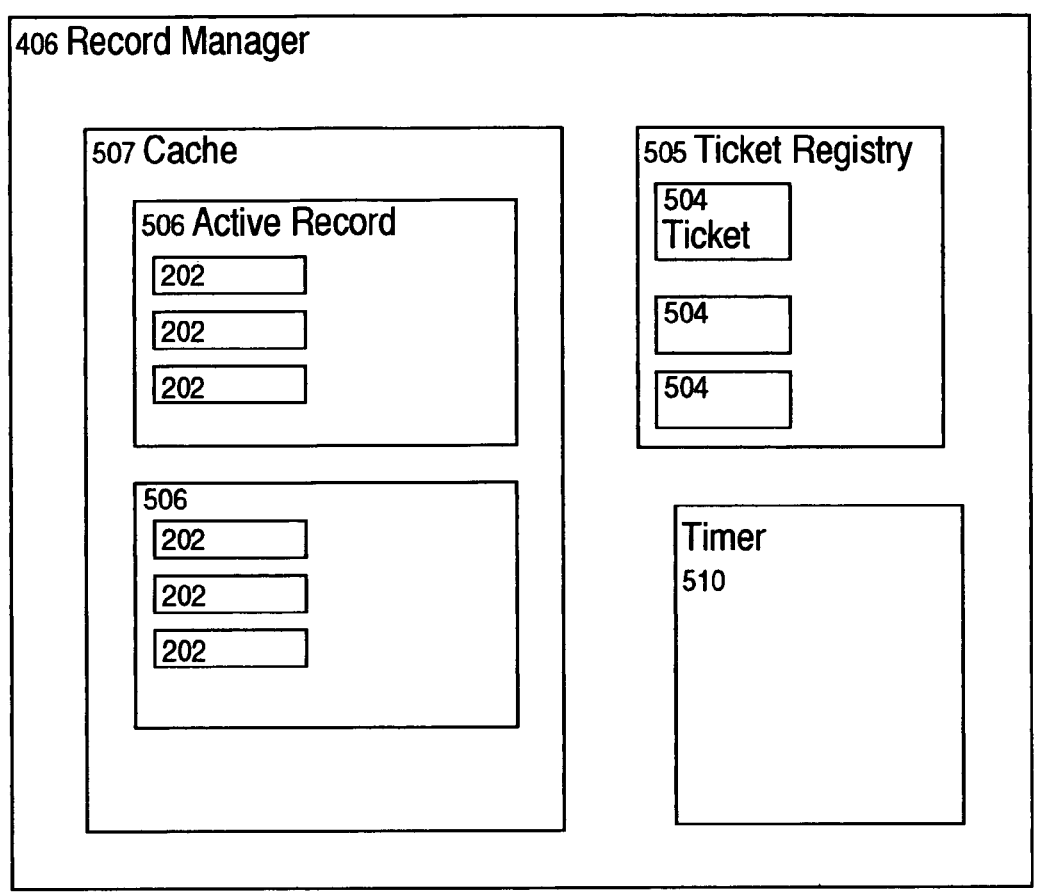
FIG. 5 illustrates details of an exemplary record manager program, according to an embodiment of the present invention

FIG. 5 illustrates an exemplary record manager 406. The record manager 406 contains a ticket registry 505, which contains a ticket 504 for each active application in the system 170. It also holds a cache 507 of active user records 506. Each cached record 506 holds a list of active views 202 which the application 150 requested. As the application 150 may request only a subset of all the available views 202, not every possible view 202 is loaded. Finally, the record manager 406 contains a timer 510 that triggers which cached records 506 and tickets 504 are timed out and removed from the cache 507.

An application 150 will request a ticket 504 from the profile repository server 158. Whenever the application program 158 needs to get or set user information, it will pass the ticket 504 as a parameter in the request. The profile repository program 158 uses this ticket 504 to keep track of which applications 150 are currently using the system 170.

A cached user record 506 is a state object that stays alive while a user navigates through, for example a website. As the user moves from one application 150 to another application 150, the cached user record 506 follows along. Thus, when the user first logs into the system 170, the cached user record 506 is almost empty. It may not be completely empty because a small amount of entitlement information may be automatically loaded. For example, fields 302 such as access level may be loaded.

As the user enters a new application 150, the application 150 requests that a set of views 202 are loaded into the cache 507. Thus, as the user navigates, the associated cached user record 506 may become larger and larger. Consequently, a clean up mechanism is used to remove either views 202 or records 506 that have been inactive for a period of time. For example, in one embodiment, the system 170 only removes entire cached records 506 of user information. However, in another embodiment, the system times out individual views 202 within the cached user record 506.

One embodiment of the present invention provides for updating user information explicitly. For example, application programs 150 may explicitly track user information, by having a user answer profile questions. Another embodiment allows for updating information implicitly. For example, the system 170 may track user behavior to create this information.

Figure 6A:
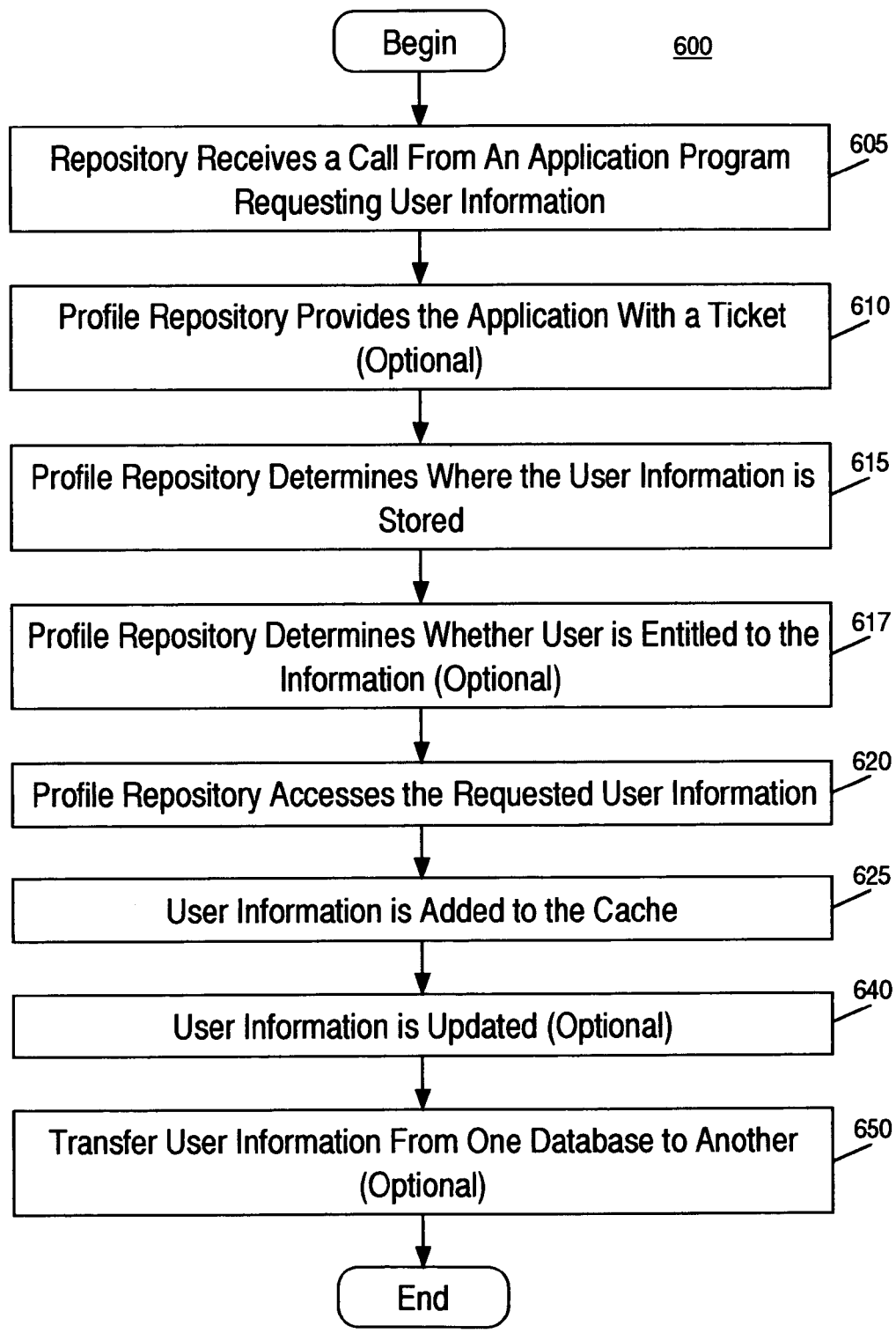
FIG. 6A is a flowchart illustrating the steps of a process of accessing a user profile, according to an embodiment of the present invention.

One embodiment provides for a process 600 of providing access to user information, the steps of which are illustrated in FIG. 6A. The steps of process 600 may be executed in a general purpose processor, for example, the computer system 100 of FIG. 7. In step 605, the process 600 receives a call from an application program 150. The call specifies a user identifier 410 and a requested set of user information (e.g., a view 202). The view 202 is one of many possible views 202 which may be requested. Each view 202 (e.g., a set of user information) comprises a plurality of fields 302. The fields 302 describe user information which is distributed over a number of databases 168. In one embodiment, the application program 150 requests a parameter (e.g., ticket 504).

In optional step 610, the user profile repository program 158 provides the application 150 with a parameter (e.g., ticket 504), which the application program 150 provides to the repository program 158 whenever it wants to read or write user information. The parameter (e.g., ticket 504) is used to track active user records 506 so that inactive records 506 may be timed-out and removed from the cache 507.

In step 615, the process 600 determines the physical location of the requested information, for example the database or databases 168 that contain the information. The process 600 may use a logical mapping of fields 302 of user information to the database 168 which stores the information. For example, a mapping such as shown in FIG. 3 may be used.

In optional step 617, the process 600 determines whether the user is entitled to the requested information. Embodiments of the present invention may determine that the user is entitled to a portion of the requested information by separately checking the entitlement status of each field 302. Alternatively, the process 600 may check the entitlement status of the requested view 202. The process 600 will not return information for which the user lacks entitlement.

In step 620, the process 600 retrieves the information for the user identifier 410 which the application program 150 passed in. For example, the process 600 uses the user identifier 410 to retrieve a first of the plurality of fields 302 from a first of the plurality of databases 168. The process 600 may also use the user identifier 410 to retrieve a second of the plurality of fields 302 from a second of the plurality of databases 168.

In step 625, the process adds the requested user information to a cache 507 of user records 200. In this fashion, the requested set of user information (e.g., view 202) is provided the application program 150.

In optional step 640, the process 600 updates user profile information on a database 168. For example, the process updates a field 302 in the set of the user information (e.g., view 202) by writing information to a first of the plurality of databases 168. In one embodiment, the update is based upon responses given by a user of the application program 150. In another embodiment, the update is based upon monitoring activity of a user of the application program 150, the activity being related to the user preferences. The present invention is well suited to operating with any number of databases 168, which may be internal or external to system 170.

In step 650, the process 600 performs the optional step of moving user information from one database 168 to another. For example, the user information corresponding to one of the fields 302 is moved. This is done transparently to the application program 150. The steps of process 600 may be repeated as the user moves from one application program 150 to another. In this case, the new user information is added to the active user record 506 in step 625.

Figure 6B:
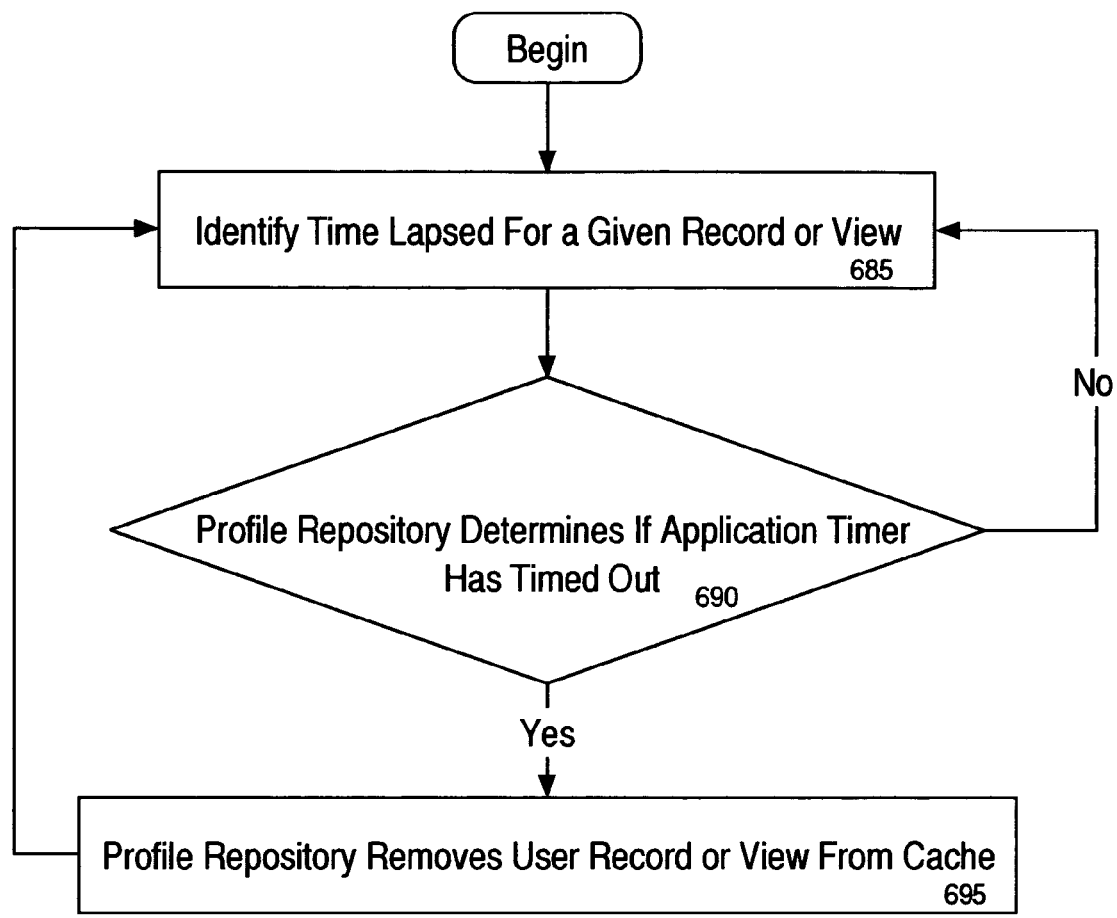
FIG. 6B is a flowchart illustrating the steps of a process of timing out an unused user record, according to an embodiment of the present invention.

One embodiment provides for a process 680 of removing a record 506 from a cache 507, the steps of which are illustrated in FIG. 6B. The steps of process 680 may be executed in a general purpose processor, for example, the computer system 100 of FIG. 7. Process 680 may be executed during the steps of process 600. In step 685, the process 680 identifies the amount of time lapsed for a given user record 506, for example, since the application 150 requested information. In one embodiment, the process 680 identifies the amount of time for a given view 202.

In step 690, the process 680 determines whether the cached user record 506 or view 202 has timed out. To accomplish this, the process 600 references the ticket 504, which was first given to the application 150 and then passed in by the application 150 when requesting user information.

If time has expired, the process 680 removes the unused information from the cache 507, in step 695. In this fashion, memory within the repository system 170 is used efficiently. Then the process 680 continues to check other user records 506 and/or views 202, in step 685.

An embodiment of the profile repository system 170 exposes a distributed API, which is used to access data. This API may be used as a wrapper for distinct data, such as entitlement data, user profile data, and data external from the system 170. The following is an exemplary API.

General API public long getTicket (String appName, String uid, String [ ] viewNames)
    appName: calling application's registered id
    uid: user's connection user id
    viewNames: array of views used by the calling application
    Request a new ticket from the Repository for the given application and user. If the requested views are not already loaded into the user's record the Repository will load them. Once loaded, these views will be kept available at least for the lifetime of this ticket.
public String [ ] getvalues (long ticketId, String [ ] fieldNames)
    ticketId: ticket returned by getTicket ( )
    fieldNames: list of field names to retrieve
    Returns field values for each of the requested field names. Tosses exception if any requested field is unknown. The field names should be in "<view>.<field>"format. This design batches field value access for efficiency in the distributed CORBA call (launch one call rather than many single-field calls).

public void setValues (long ticketID, String[ ] fieldNames, String [ ] fieldValues)
    ticketed: ticket returned by getTicket ( )
    fieldNames: list of field names to set
    fieldValues: list of corresponding field values
    Set the field values for list of given fields. Note that the caller must have write permissions to all requested fields (views containing these fields) or an exception will be generated. There must be a 1-to-1 correspondence between each element in fieldNames and fieldValues. Also tosses an exception if caller attempts to set a field to an illegal value.
public void releaseTicket (long ticketId)
    ticketId: ticket returned by getTicket ( )
    Informs the Repository that it may release the given ticket from active use. Tickets will time out automatically after a period of disuse, however those applications able to know with certainly that a user is done with a ticket can call this method to greatly improve resource utilization in the Repository. Batch programs that work with multiple users (and hence require multiple tickets) must call this method to avoid filling up the Repository's ticket registry.

Administrative API

Several API calls are for administrative uses and should generally not be called by applications. If the production CORBA infrastructure provides technology to secure certain calls from being made by the general public, these methods would be locked down so only qualified applications could call them.
public long upSince ( )
    Returns a long value (Unix timestamp) when the current ProfileRepository instance was started.
public int getRecordCount ( )
    Returns a count of how many currently active records are in the Repository's cache.
public int getTicketCount ( )
    Returns a count of how many currently active tickets are in the Repository's ticket registry.
public boolean reloadRecord (String uid)
    uid: user's connection id
    Requests that the given user's record be reloaded. This would occur when some administration tool has changed the user's record in another process. In order for those changes to be visible to the user, their record must be reloaded. Therefore the admin tool that initiated the change would call this method to reload the user's information and make the changes visible.
public void halt (String password)
    password: access password known only to qualified apps
    Requests that the current ProfileRepository instance be gracefully shut down. Obviously this is intended to be used by a very few admin utilities, hence the use of a password. The password is a simple attempt at crude security until a CORBA infrastructure that includes security can be provided.

Concurrency

There is a small but inevitable possibility that more than one application 150 will be accessing the same user record 200 at the same time. This is perfectly fine as long as all applications 150 are only reading the record's 200 contents. If more than one of them needs to write to the record 200, concurrency issues arise.

To keep multiple writing applications 150 from stepping on each other's toes the Profile Repository 170 implements a simple concurrency mechanism. The user record 200 is given a version number when it is first loaded. When an application 150 requests a ticket 504 the current record version number is stored in the ticket 504. Each time the application 150 does a read operation their ticket's version number is updated (synchronized) with the latest version number of the record 200. Each time an application 150 performs a write, the record's version number is updated, as well as that the version number in the writing application's ticket 504.

To show how this works, imagine two applications 150 that share the same user record 200. Version 1 is stored in the record and both applications' tickets 504. Now application 2 performs a write, which changes the record's version to 2 as well as the version in this application's ticket 504.

If application 1 attempts to perform a write at this point, the Profile Repository 170 will throw a TicketException because record 200 has changed since the last time this application 150 has read the record 200.

In order to proceed, application 1 will have to re-read the record 200 which will re-synchronize the version number in it's ticket 504 with the current version number of the record 200. Then its writes will succeed. Note that it is the responsibility of the application 150 to be sure it re-reads information it finds important.

Cache Behavior

The Profile Repository 170 caches user record information for the obvious benefit of maximum performance. The drawback is a risk of further concurrency problems in addition to those described in the previous section. In order to balance the need for performance with the need for data integrity, the Profile Repository 170 is a write-through cache (all writes to the record are immediately pushed through to physical storage).

Record Creation API

In one embodiment, the Profile Repository 170 published CORBA API is for Read/Update only (i.e. empty record is an error). A Create API is for special applications 150 (e.g. Registration Wizard/Profile Update). A world of complexity is introduced if applications are allowed to create brand new records. Most of the complexity involves how to handle partial records 200 such that they won't accidentally break an integrity rule. Therefore record creation is allowed for only a few special applications that will have a greater burden placed upon them to handle these complexities. These applications 150 will directly with the repository class library rather than the CORBA API.

Tables and Views

One embodiment organizes the information on a database in tables. In the simplest case, there is a one-one relationship between tables and views 202. This poses no problems. Similarly, a view 202 that wholly contains multiple tables presents no problems. The challenge lies when more than one view 202 shares mappings to the same table.

If it is unavoidable that a required field 302 must be placed into a shared table, one embodiment accomplishes this as follows. When the field 302 is added to the table it can be populated with the text string "NULL" which is equivalent to an actual null value in the Repository system 170. Because of the way the Repository 170 is constructed it will never re-write "NULL" back to the database 168. Therefore the database 168 is happy because there is a value in the required field 302 and the repository views 202 shouldn't receive database errors from fields invisible to them. The effect of this "fix" is to create a tri-state field that is ignored until the first time someone sets it to a non-"NULL" value. After that, the system will not allow it to be null, or reset to "NULL".

Figure 8:
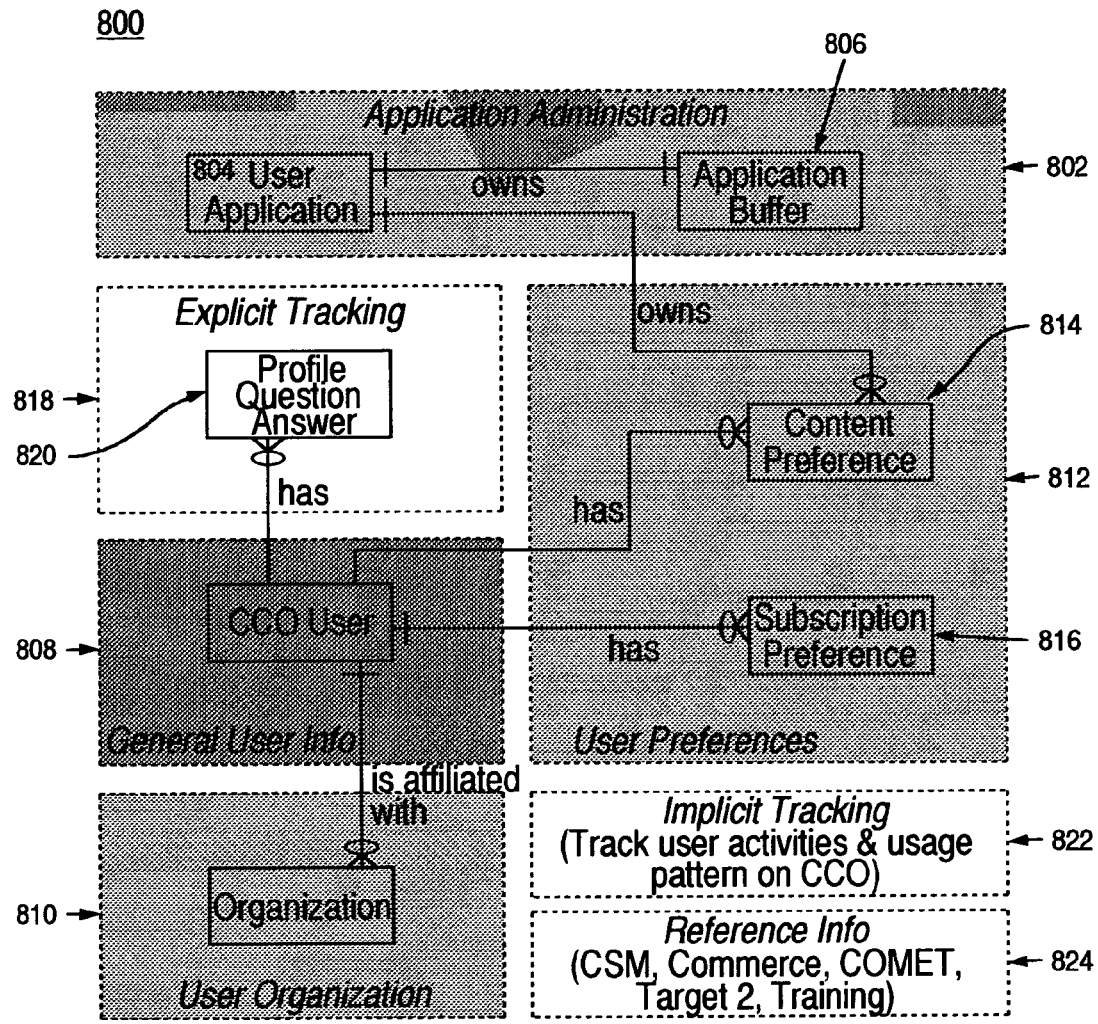
FIG. 8 is an exemplary entity relationship diagram, according to an embodiment of the present invention.

FIG. 8 illustrates an exemplary entity relationship diagram 800. The Application Administration area 802 contains client application information. Each application needs to register in order to user use the Profile Repository 170, and the registration data is captured in the User_Application entity 804. The Application_Buffer entity 806 provides buffers for application-specific information that otherwise would need to be stored elsewhere. While applications are encouraged to store only enterprise-wide data that is sharable to other applications, the buffers offer flexibility to client applications that only need to store a small amount of application-specific data in the Profile Repository 170 without having to develop their own databases to do it.

The General User Information area 808 contains general data about connection users such as phone number and address. Note that the general user information contains person-centric data, e.g. it contains home address and phone in addition to non-English versions of key user information for globalization purposes.

The Organization area 810 contains information about organizations that connection users are affiliated with. Note that a user can be affiliated with many organizations—this overcomes the limitation of prior systems which can only represent one user-organization relationship. Besides having the general organization information in both English and non-English, the Organization entity also contains the ERP Company ID which will be instrumental in linking organization information in the Profile Repository 170 with other enterprise data sources 168c.

The User Preferences area 812 contains preference information such as content preferences and subscription preferences via the Content_Preference entity 814 and the Subscription_Preference entity 816 respectively. The Content_Preference entity 814 is designed to support dynamic personalization features. Note that content hierarchies (e.g. the relationship between page, categories and links) are not stored in the Profile Repository 170 but are assumed to be stored in a separate content repository. The Subscription_Preference entity 816 contains application subscription information in addition to notification preferences.

The Explicit Tracking area 818 contains user information that is tracked explicitly by applications 150. The Profile_Question_Answer entity 820 contains user answers to profile questions. Applications 150 can derive useful information and provide personalization functionality based on these answers to profile questions.

The empty Implicit Tracking 822 and Reference Information 824 areas represent the Profile Database's 170 intention of capturing user behaviors on connection in addition to integrating with key data sources and systems to provide a logical, encompassing view of user information. The Implicit Tracking area 822 will track user behaviors and dynamically generate transient view of user information. Transient data are not necessarily stored in database and lasts only for the duration of the user session.

Figure 7:
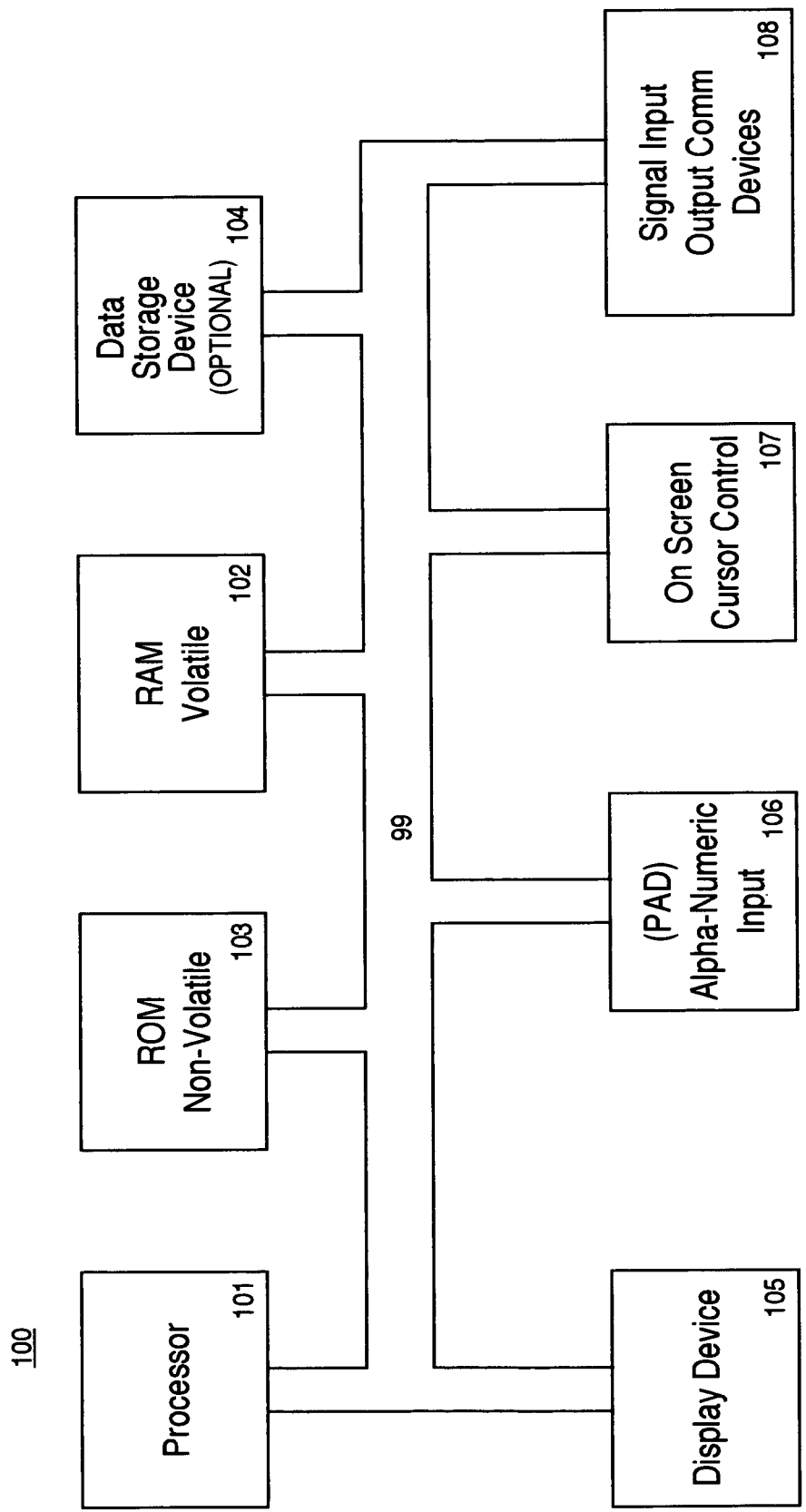
FIG. 7 is a schematic of a computer system, which may form a platform upon which to practice embodiments of the present invention.

FIG. 7 illustrates circuitry of a computer system 100, which may form a platform upon which to perform an embodiment of the present invention. Computer system 100 includes an address/data bus 99 for communicating information, a central processor 101 coupled with the bus for processing information and instructions, a volatile memory 102 (e.g., random access memory RAM) coupled with the bus 99 for storing information and instructions for the central processor 101 and a non-volatile memory 103 (e.g., read only memory ROM) coupled with the bus 99 for storing static information and instructions for the processor 101. Computer system 100 also includes an optional data storage device 104 coupled with the bus 99 for storing information and instructions.

Also included in computer system 100 of FIG. 7 is an optional alphanumeric input device 106. Device 106 can communicate information and command selections to the central processor 101. System 100 also includes an optional cursor control or directing device 107 coupled to the bus 99 for communicating user input information and command selections to the central processor 101. The display device 105 utilized with the computer system 100 may be a liquid crystal device, cathode ray tube (CRT), field emission device (FED, also called flat panel CRT) or other display device suitable for creating graphic images and alphanumeric characters recognizable to the user. Signal communication device 108, also coupled to bus 99, can be a serial port.

The preferred embodiment of the present invention, a method and device for providing distributed access to user profile information, is thus described. While the present invention has been described in particular embodiments, it should be appreciated that the present invention should not be construed as limited by such embodiments, but rather construed according to the below claims.

We claim:

1. A method of providing access to information comprising the steps of:
    a) a repository receiving a call from an application program, said call specifying a user identifier and a requested logical collection of information of a plurality of logical collections of information;
    b) in response to said call, said repository determining locations having portions of said requested logical collection of information corresponding to said user identifier by:
        b1) determining a plurality of fields associated with said requested logical collection of information, wherein said fields describe information distributed over a plurality of databases; and
        b2) accessing a stored mapping of said fields to said databases, said mapping stored on said repository;
    c) using said user identifier and said stored mapping, said repository retrieving information corresponding to a first of said plurality of fields from a first of said plurality of databases;
    d) using said user identifier and said stored mapping, said repository retrieving information corresponding to a second of said plurality of fields from a second of said plurality of databases, wherein said first and second database store information in a different format from one another;
    e) said repository providing said requested logical collection of information to said application program, retrieved from said first and second databases; and
    f) said repository storing in a cache said requested logical collection of information which was requested by said application program.

2. The method of claim 1 further comprising determining entitlement status corresponding to said user identifier with respect to said set of information.

3. The method of claim 1 further comprising said repository updating a first of said plurality of fields in said requested logical collection of said information by writing information to a first of said plurality of databases.

4. The method of claim 3 wherein said update is based upon responses given by a user of said application program.

5. The method of claim 3 wherein said update is based upon monitoring activity of a user of said application program, said activity being related to said requested logical collection of information, wherein said first of said plurality of fields in said logical collection of said information is updated implicitly.

6. The method of claim 1 wherein said databases comprise a first database with entitlement information thereon and a second database with user profile information thereon.

7. The method of claim 1 further comprising the steps of:
    said repository providing a parameter to said application program that is used to track active user records stored in said cache;
    said repository receiving said parameter from said application program in order to track a user record associated with said call; and
    said repository deleting said user record from said cache if said user record is inactive, based on the received parameter.

8. The method of claim 1, further comprising repeating said a)–f) for application programs that are compliant with different programming languages from one other.

9. The method of claim 1, further comprising:
    said repository performing concurrency management of information stored on said plurality of databases, wherein said repository is a central repository.

10. The method of claim 9, further comprising;
    said central repository associating a version number with a user record;
    said central repository updating the version number if the user record is updated;
    said central repository providing the current version number of said user record to applications requesting said user record; and
    said central repository allowing a write involving said user record only if a version number of said user record that is provided by an application attempting said write matches the version number currently associated with said user record.

11. The method of claim 1, wherein said stored mapping of said fields to said databases maps fields associated with said requested set of information to databases, and wherein said first field is mapped to said first database and said second field is mapped to said second database in said stored mapping.

12. In a computer system having a processor coupled to a bus, a computer readable medium coupled to said bus and having stored therein a computer program that when executed by said processor causes said computer system to implement a method of providing a data repository, said method comprising:
    a) receiving a call from an application program, said call specifying a user identifier and a requested logical collection of information of a plurality of logical collections of information;
    b) in response to said call, determining locations having portions of said requested logical collection of information corresponding to said user identifier by:

b1) determining a plurality of fields associated with said requested logical collection of information, wherein said fields describe information distributed over said plurality of databases; and b2) accessing a stored mapping of said fields to said databases, said mapping stored on said data repository;

c) using said user identifier, retrieving information corresponding to a first of said plurality of fields from a first of said plurality of databases;

d) using said user identifier, retrieving information corresponding to a second of said plurality of fields from a second of said plurality of databases, wherein said first and second database store information in a different format from one another; and e) providing said requested logical collection of information to said application program;

f) storing said requested logical collection of information in the data repository.

13. The computer readable medium of claim 12 wherein said method further comprises determining entitlement status corresponding to said user identifier with respect to said requested logical collection of information.

14. The computer readable medium of claim 12 wherein said method further comprises updating a second of said plurality of fields in said requested logical collection of said information by writing information to a first of said plurality of databases.

15. The computer readable medium of claim 12 wherein said requested logical collection of information comprises information relating to a single user.

16. The computer readable medium of claim 12 wherein said requested logical collection of information comprises information relating to a group of users.

17. The computer readable medium of claim 12, wherein said method further comprises providing a parameter to said application program that is used to track active user records.

18. The computer readable medium of claim 17, wherein said a) of said method further comprises receiving said parameter from said application program, wherein a user record associated with said call is tracked.

19. A computer readable medium having stored thereon program instructions for implementing a data repository operable to access information stored on a plurality of databases having different data formats, said data repository comprising:

a view manager organizing a user record into a plurality of logical collections of information, said logical collections of information comprising data fields;

an object request broker operable to receive a request to said repository from an application and operable to return to said application a requested logical collection of information corresponding to a specified user identifier;

a datasource manager having a stored mapping of the data fields to said databases, wherein the datasource manager is operable to access the requested logical collection of information by forming database requests to at least two of the databases having different data formats; and a record manager operable to store the requested logical collection of information and to remove the requested logical collection of information based on a pre-determined period of time.

20. The computer readable medium of claim 19, wherein a first of the databases comprises entitlement information.

21. The computer readable medium of claim 19, wherein a second of the databases comprises user profile information.

22. The computer readable medium of claim 19, wherein said datasource manager is further operable to update said requested logical collection by writing to a first of said databases.

23. The computer readable medium of claim 19, wherein at least one of the databases resides external to a computer system in which said computer readable medium resides, and wherein said stored mapping maps to said external database.

24. The computer readable medium of claim 19, wherein said requested logical collection pertains to a single user.

25. The computer readable medium of claim 19, wherein said requested logical collection pertains to a group of users.

26. The computer readable medium of claim 19, wherein said object request broker is further operable to process requests originating from more than one programming language.

27. The computer readable medium of claim 19, wherein said object request broker is further operable to process requests originating from more than one computing platform.

28. The computer readable medium of claim 19, wherein said object request broker is accessed via a published user record read/update application program interface (API) that is used by said application to read and update user records on the plurality of databases.

29. The computer readable medium of claim 28, wherein said user repository is accessing via a user record creation API that is used by a limited set of applications for creation of user records on the plurality of databases.

30. A data repository operable to access information stored on a plurality of databases having different data formats, said data repository comprising:

means for organizing a user record into a plurality of logical collections of information, said logical collections of information comprising data fields;

means for receiving a request to said repository from an application and for returning to said application a requested logical collection of information corresponding to a specified user identifier;

means for storing mapping of the data fields to said databases;

means for accessing the requested logical collection of information by forming database requests to at least two of the databases having different data formats; and means for storing the requested logical collection of information and for removing the requested logical collection of information based on a pre-determined period of time.

31. The data repository of claim 30, further comprising means for updating said requested logical collection by writing to a first of said databases.

* * * * *